(12) United States Patent
Okabe (10) Patent No.: US 10,772,801 B2
(45) Date of Patent: Sep. 15, 2020

(54) TABLET PRINTING APPARATUS AND TABLET PRINTING METHOD

(71) Applicant: SHIBAURA MECHATRONICS CORPORATION, Yokohama-shi (JP)

(72) Inventor: Yutaka Okabe, Yokohama (JP)

(73) Assignee: SHIBAURA MECHATRONICS CORPORATION, Yokohama-shi (JP)

( * ) Notice: Subject to any disclaimer, the term of this patent is extended or adjusted under 35 U.S.C. 154(b) by 158 days.

(21) Appl. No.: 15/997,756

(22) Filed: Jun. 5, 2018

(65) Prior Publication Data

US 2018/0280241 A1 Oct. 4, 2018

Related U.S. Application Data

(63) Continuation of application No. PCT/JP2016/087251, filed on Dec. 14, 2016.

(30) Foreign Application Priority Data

Dec. 24, 2015 (JP) .................................. 2015-252299

(51) Int. Cl.
*B41F 17/36* (2006.01)
*B41M 1/40* (2006.01)
(Continued)

(52) U.S. Cl.
CPC ............... *A61J 3/007* (2013.01); *B41J 3/407* (2013.01); *B41J 11/007* (2013.01);
(Continued)

(58) Field of Classification Search
CPC .......... B41F 17/36; B41J 3/407; B41J 3/4073; B41J 11/007; B41J 11/0085; B41J 11/0095; B65G 15/58; A61J 3/007; A61J 3/06
(Continued)

(56) References Cited

U.S. PATENT DOCUMENTS 5,423,252 A * 6/1995 Yamamoto ............... B41F 17/36
101/35
5,695,043 A 12/1997 Maezuru et al.
(Continued)

FOREIGN PATENT DOCUMENTS

JP 3-118917 U 12/1991
JP 7-81050 3/1995
(Continued)

OTHER PUBLICATIONS

International Search Report dated Feb. 21, 2017, issued in PCT/JP2016/087251 filed Dec. 14, 2016.

*Primary Examiner* — Leslie J Evanisko
(74) *Attorney, Agent, or Firm* — Oblon, McClelland, Maier & Neustadt, L.L.P.

(57) ABSTRACT

According to one embodiment, a tablet printing apparatus includes: a conveyor belt configured to convey a tablet; a first suction path configured to suck the tablet to hold the tablet on the conveyor belt and suck the conveyor belt while allowing the conveyor belt to convey the tablet; a second suction path configured as a different path from the first suction path to suck only the conveyor belt while allowing the conveyor belt to convey the tablet; and a printer configured to perform printing on the tablet conveyed by the conveyor belt.

11 Claims, 4 Drawing Sheets

(51) Int. Cl.
  *A61J 3/00*   (2006.01)
  *B65G 15/58*  (2006.01)
  *B41J 11/00*  (2006.01)
  *B41J 3/407*  (2006.01)
  *A61J 3/10*   (2006.01)
(52) U.S. Cl.
  CPC ........ *B41J 11/0085* (2013.01); *B41J 11/0095* (2013.01); *B65G 15/58* (2013.01); *A61J 3/10* (2013.01)
(58) Field of Classification Search
  USPC .......................................................... 101/35
  See application file for complete search history.

(56) References Cited

U.S. PATENT DOCUMENTS

| | | | |
|---|---|---|---|
| 7,311,045 B2 * | 12/2007 | Ackley, Jr. ............... | A23G 3/28 101/35 |
| 2011/0128557 A1 | 6/2011 | Kinoshita et al. | |

FOREIGN PATENT DOCUMENTS

| | | |
|---|---|---|
| JP | 2505273 Y2 | 7/1996 |
| JP | WO2009/025371 A1 | 2/2009 |

* cited by examiner

TABLET PRINTING APPARATUS AND TABLET PRINTING METHOD

CROSS-REFERENCE TO THE RELATED APPLICATION

This application is based upon and claims the benefit of priority from International Application No. PCT/JP2016/087251, filed on Dec. 14, 2016 and Japanese Patent Application No. 2015-252299, filed on Dec. 24, 2015; the entire contents of all of which are incorporated herein by reference.

FIELD

Embodiments described herein relate generally to a tablet printing apparatus and a tablet printing method.

BACKGROUND

A technique that uses an inkjet print head to preform printing is known for printing identification information such as characters, letters, marks or the like on a tablet. In a tablet printing apparatus using this technique, tablets are conveyed by a tablet conveying device such as a conveyor. Ink (for example, edible ink) is ejected from a nozzle of the inkjet print head located above the tablet conveying device toward each tablet passing under the print head to print identification information on the tablet. As the tablet conveying device, there has been developed a device that holds tablets on the conveyor belt with a suction force. This tablet conveying device sucks the tablets onto the conveyor belt to hold them.

Generally, a plurality of, for example, circular or rectangular suction ports are formed in the conveyor belt so as to line up in the conveying direction to suck and hold tablets. The tablets supplied onto the suction ports are held on the conveyor belt by suction from the suction ports. However, there may be a suction port that is not completely closed by a tablet. For example, the suction port may be closed only partly depending on the size, shape, posture, or the like of the tablet, or the suction port may not be closed at all due to random supply of the tablets. When the suction port is not completely closed by the tablet, an airflow is generated above the suction port as the air is sucked from the suction port. In particular, when the suction force is strong, the amount and the flow rate of air sucked increase. This results in a stronger airflow or increased reach of the airflow, and thereby turbulence may occur.

With the inkjet print head, printing is performed by ejecting ink from the print head toward the tablet such that the ink hits on the surface of the tablet. Accordingly, the ink ejected from the print head is flying between the print head and the tablet until it hits on the tablet. At this time, if an airflow is generated in the space between the print head and the tablet, the ink does not hit on a desired position, and the print quality is degraded. For example, in the case where the airflow is strong, the airflow has a wide reach, or the airflow is disturbed, the print quality is remarkably degraded. Further, when the influence of the airflow reaches the vicinity of the nozzle of the print head, the ink around the nozzle dries, thereby causing ejection failure. As a result, the print quality is also degraded. In addition, ink that has not hit on the tablet may sometimes scatter in the form of mist. If the ink scatters like mist, for example, it may adhere to the side surface of the tablets being conveyed.

Therefore, in order to suppress the airflow, it is necessary to reduce the suction force of the suction port, i.e., the suction force for sucking the tablets. However, if the suction force for sucking the tablets is reduced, the force for supporting the conveyor belt is also reduced since the conveyor belt is sucked and supported through the same path as the suction path for sucking the tablets. When the force for supporting the conveyor belt is reduced, the conveyor belt may be lifted off the conveyor body or it may move up and down. In this case, the positional deviation of the tablet occurs, and the print quality is degraded.

DETAILED DESCRIPTION

According to one embodiment, a tablet printing apparatus includes: a conveyor belt configured to convey a tablet; a supplier configured to supply the tablet onto the conveyor belt; a first suction path configured to suck the tablet on the conveyor belt to hold the tablet on the conveyor belt and suck the conveyor belt while allowing the conveyor belt to convey the tablet; a second suction path configured as a different path from the first suction path to suck only the conveyor belt while allowing the conveyor belt to convey the tablet; a position detector configured to detect the position of the tablet conveyed by the conveyor belt; and a printer configured to perform printing on the tablet conveyed by the conveyor belt.

According to another embodiment, a tablet printing method is provided for printing on a tablet conveyed by a conveyor belt. The tablet printing method includes: sucking the tablet on the conveyor belt by a first suction force provided by a first suction path to hold the tablet on the conveyor belt; and sucking only the conveyor belt by a second suction force provided by a second suction path configured as a different path from the first suction path.

First Embodiment

A first embodiment will be described with reference to FIGS. 1 to 5.

Basic Configuration

Figure 1:
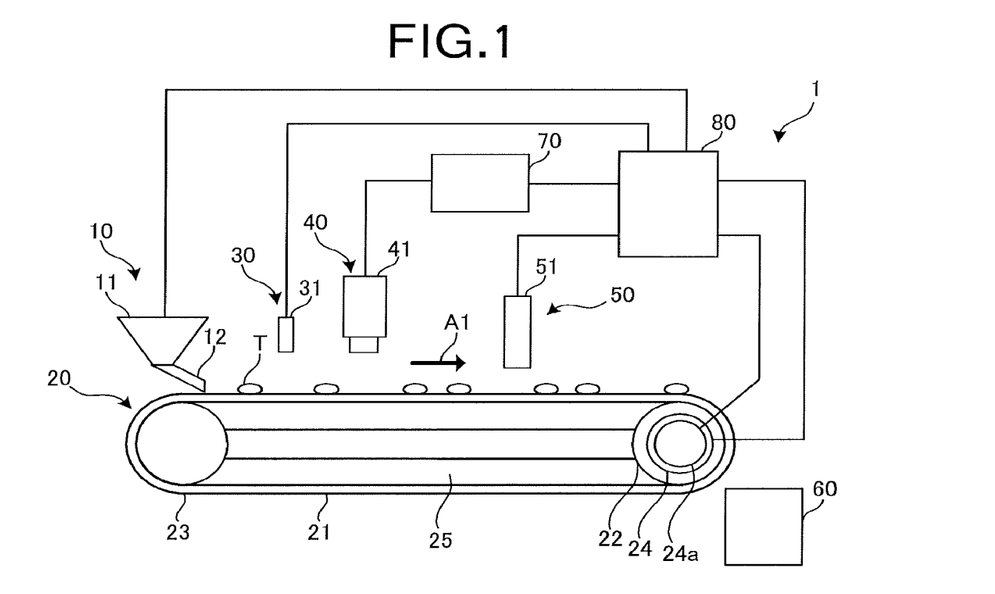
FIG. 1 is a diagram illustrating the schematic configuration of a tablet printing apparatus according to a first embodiment.
Figure 2:
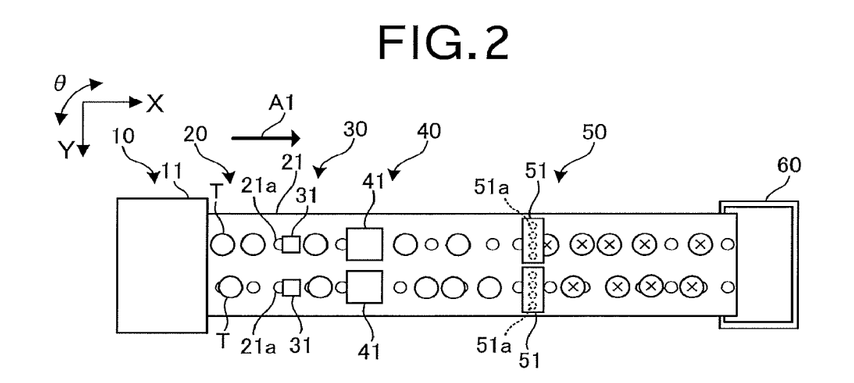
FIG. 2 is a plan view illustrating a part of the tablet printing apparatus of the first embodiment.

As illustrated in FIGS. 1 and 2, a tablet printing apparatus 1 of the first embodiment includes a supply device (supplier) 10, a conveying device (tablet conveying device) 20, a detecting device 30, an imaging device 40, a printing device 50, a collecting device 60, an image processing device 70, and a control device 80. The detecting device 30 and the imaging device 40 function as a position detector.

The supply device 10 includes a hopper 11 and a chute 12. The hopper 11 stores a plurality of tablets T and sequentially supplies the tablets T to the chute 12. The chute 12 aligns the tablets T in a plurality of rows (two rows in the example of FIG. 2) and supplies them to the conveying device 20. The supply device 10 is electrically connected to the control device 80, and is driven under the control of the control device 80.

The conveying device 20 includes a conveyor belt 21, a drive pulley 22, a driven pulley 23, a drive part 24, and a suction part 25. The conveyor belt 21 is formed to be endless and wrapped around the drive pulley 22 and the driven pulley 23. The drive pulley and the driven pulley 23 are arranged to be rotatable about a shaft, and the drive pulley 22 is connected to the drive part 24. The drive part 24 is, for example, a motor or the like. The drive part 24 is electrically connected to the control device 80, and is driven under the control of the control device 80. The drive part 24 includes a position detector 24a such as a rotary encoder. The position detector 24a sends a detection signal to the control device 80. The control device 80 can obtain information such as the position, speed, and movement amount of the conveyor belt 21 based on the detection signal.

In the conveying device 20, the conveyor belt 21 rotates together with the driven pulley 23 as the drive pulley 22 is rotated by the drive part 24 to convey the tablets T on the conveyor belt 21 in the direction of arrow A1 in FIGS. 1 and 2 (conveying direction A1). As illustrated in FIG. 2, a plurality of circular tablet suction ports 21a are formed in the conveyor belt 21. These tablet suction ports 21a are arranged in two rows along the conveying direction A1 so as to form two conveying paths, and each function as an opening for sucking the tablet T. The suction part 25 functions as a suction mechanism for sucking the tablets T on the conveyor belt 21 to hold them and sucking the conveyor belt 21 such that the conveyor belt 21 can convey the tablets T without moving up and down (details will be described later).

The detecting device 30 includes a plurality of detection parts 31 (two in the example of FIG. 2). The detection parts 31 are arranged above the conveyor belt 21, one for each conveying path of the tablets T. The detection parts 31 are located on the downstream side of the supply device 10 in the conveying direction A1 above the two conveying paths, and are arranged in a direction crossing the conveying direction A1 (for example, a direction perpendicular to the conveying direction A1) in the horizontal plane. Each of the detection parts 31 detects the tablets T on the conveyor belt 21 by projecting and receiving laser beams. The detection parts 31 are electrically connected to the control device 80 and send detection signals to the control device 80. For example, various laser sensors (laser displacement meters) such as reflection laser sensors can be used as the detection parts 31. Besides, various shapes of laser beams such as spot beams and line beams can be used.

The imaging device 40 includes a plurality of imaging parts 41 (two in the example of FIG. 2). The imaging parts 41 are arranged above the conveyor belt 21, one for each conveying path of the tablets T. The imaging parts 41 are located on the downstream side of the detecting device 30 in the conveying direction A1 above the two conveying paths, and are arranged in a direction crossing the conveying direction A1 (for example, a direction perpendicular to the conveying direction A1) in the horizontal plane. The imaging field of view of the imaging parts 41 is set to such a size that only one tablet T conveyed by the conveyor belt 21 is in the imaging field of view and the tablets T on the upstream side or the downstream side in the conveying direction A1 and the tablets T in the adjacent row are not therein. Each of the imaging parts 41 performs imaging at the timing when each of the tablets T reaches immediately below it to capture an image including the upper surface of the tablet T, and sends the image to the image processing device 70. Various cameras having an imaging device such as, for example, a charge-coupled device (CCD) or a complementary metal-oxide semiconductor (CMOS) can be used as the imaging parts 41. Each of the imaging parts 41 is electrically connected to the control device 80 via the image processing device 70, and is driven under the control of the control device 80. There may also be provided an illumination for imaging as necessary.

The printing device 50 includes a plurality of inkjet print heads 51 (two in the example of FIG. 2). The print heads 51 are arranged above the conveyor belt 21, one for each conveying path of the tablets T, and located on the downstream side of the imaging device 40 in the conveying direction A1. The print head 51 includes a plurality of nozzles 51a (see FIG. 2), and ejects ink (an example of a liquid) individually from the nozzles 51a. The print heads 51 are provided such that the direction in which the nozzles 51a are aligned intersects the conveying direction A1 (for example, perpendicularly to the conveying direction A1) in the horizontal plane. Various inkjet print heads having a drive element such as, for example, a piezoelectric element, a heat generating element, a magnetostrictive element or the like can be used as the print heads 51. Each of the print heads 51 is electrically connected to the control device 80, and is driven under the control of the control device 80.

The collecting device 60 is located on the downstream side of the printing device 50 in the conveying direction A1, and is located at the end of the conveying device 20 on the downstream side in the conveying direction A1. The collecting device 60 is configured to be able to sequentially receive and collect the tablets T released from holding by the conveying device 20 and dropped therefrom. The conveying device 20 releases the holding of each of the tablets T on the conveyor belt 21 when the tablet T reaches a desired position, for example, the end of the conveying device 20 on the downstream side in the conveying direction A1.

The image processing device 70 takes in the image captured by the imaging device 40. The image processing device 70 processes the image using a known image processing technique, and detects the positional deviation of the tablet T in the X direction, Y direction, and θ direction (see FIG. 2). The positional deviation in the X and Y directions corresponds to the positional deviation of the tablet T with respect to the center of the imaging field of view. The image processing device 70 detects how much the tablet T deviates from the center. As one example, the conveying direction A1 of the tablets T is the X direction, and a direction perpendicular thereto is the Y direction. Besides, the positional deviation in the θ direction corresponds to a rotational deviation of the tablet T in the horizontal plane. The positional deviation in the θ direction is detected when the tablet T has a directional property such as when the tablet T has a split line or when the tablet T is formed in an elliptical shape, an oval shape, a quadrangular shape, or the like.

The image processing device 70 sends information on the positional deviation of the tablet T in the X direction, Y direction, and θ direction detected to the control device 80. The image processing device 70 adds identification information of each of the imaging parts 41 to the positional deviation information when sending the positional deviation information to the control device 80. Thereby, the control device 80 can identify that the sent positional deviation information relates to which one of the two rows of the tablets T.

The control device 80 includes a microcomputer for intensively controlling each unit and a storage (not illustrated) for storing processing information, various programs and the like. The control device 80 controls the supply device 10, the conveying device 20, the imaging device 40, the printing device 50, and the image processing device 70 based on various information and various programs. In addition, the control device 80 receives detection signals and the like sent from the detecting device 30 and the position detector 24a. Further, based on the positional deviation information in the X direction, Y direction, and θ direction of each tablet T received from the image processing device 70, the control device 80 sets printing conditions for the tablet T the positional deviation of which has been detected in the X direction, Y direction, and θ direction. The storage stores print data including print patterns such as letters, characters and symbols to be printed on the tablets T and print positions where a letter, a character or a symbol is printed on the tablets T, information on the movement speed of the conveyor belt 21, and the like.

Suction Part

Next, the suction part 25 will be described in detail with reference to FIGS. 3 to 5.

Figure 3:
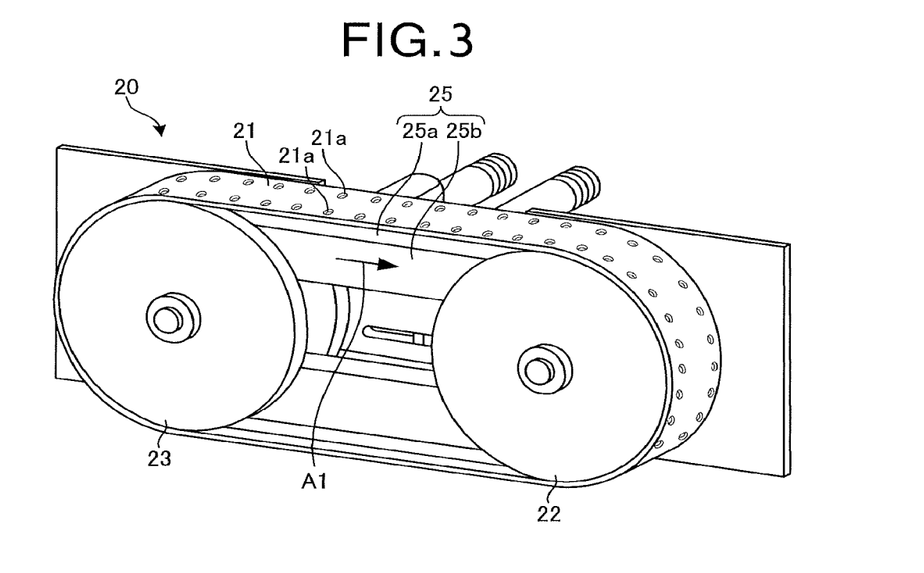
FIG. 3 is a perspective view illustrating a tablet conveying device of the first embodiment.
Figure 4:
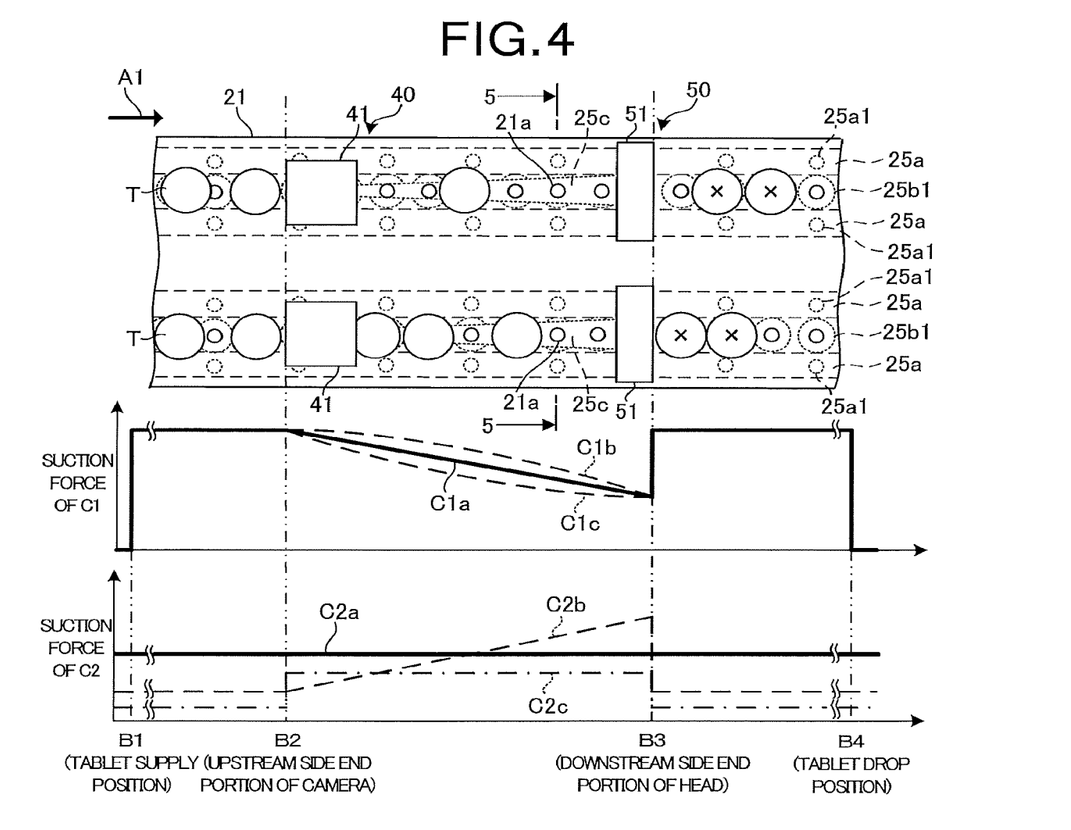
FIG. 4 is a diagram for explaining changes in the suction force of the tablet conveying device according to the first embodiment.
Figure 5:
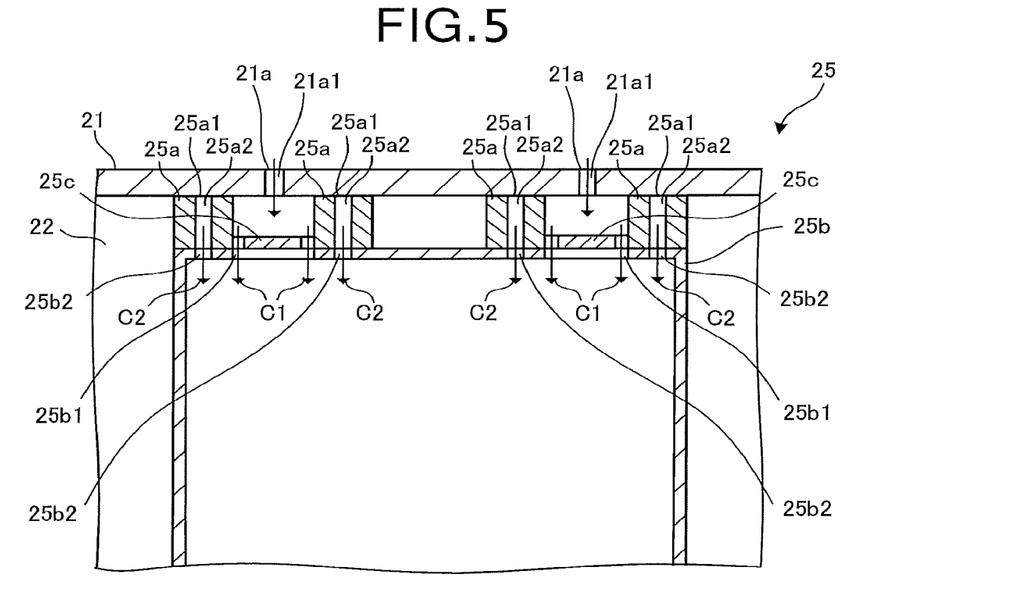
FIG. 5 is a cross-sectional view illustrating an enlarged view of a part of the tablet conveying device of the first embodiment (taken along the line 5-5 in FIG. 4)

As illustrated in FIGS. 3 to 5, the suction part includes a plurality of guide portions 25a and a suction chamber 25b.

As illustrated in FIGS. 3 and 4, each of the guide portions 25a is formed in, for example, a rail shape extending in the conveying direction A1. As illustrated in FIG. 4, the guide portions 25a are arranged in parallel in the conveying direction A1, two for each conveying path of the tablets T over the entire circumference of the conveyor belt 21. The two rows of the guide portions 25a for each conveying path of the tablets T constitute one set and function as a pair of guide portions. In the guide portions 25a, a plurality of belt suction ports 25a1 are formed at regular intervals in a line in the conveying direction A1.

As illustrated in FIG. 5, each of the guide portions 25a is provided on the outer surface of the suction chamber 25b, and supports the conveyor belt 21 horizontally. The guide portions 25a function as a guide member that guides the conveyor belt 21 in the conveying direction A1 while supporting the conveyor belt 21. Therefore, each of the guide portions 25a is located between the conveyor belt 21 and the suction chamber 25b. Accordingly, as compared to the contact area between the conveyor belt 21 and the suction chamber 25b which are in direct contact, the contact area of the conveyor belt 21 and each of the guide portions 25a is small. Thus, it is possible to reduce the frictional resistance of the conveyor belt 21 with respect to other members. Thereby, smooth movement of the conveyor belt 21 can be realized.

As illustrated in FIG. 5, a through hole 25a2 extending in the vertical direction is formed in the guide portions 25a. The opening on the upper end side of the through hole 25a2 corresponds to the belt suction port 25a1. In addition, through holes 21a1 extending in the vertical direction is formed in the conveyor belt 21. The opening on the upper end side of the through hole 21a1 corresponds to the tablet suction port 21a. As illustrated in FIG. 4, the tablet suction ports 21a are aligned in the conveying direction A1 of the tablets T. The belt suction ports 25a1 are arranged in two rows along the conveying direction A1 of the tablets T so as to sandwich the row of the tablet suction ports 21a. Specifically, the belt suction ports 25a1 are formed so as to sandwich the tablet suction ports 21a from directions crossing the conveying direction A1 of the tablets T (a direction perpendicular to the conveying direction in FIG. 4).

As illustrated in FIG. 3, the suction chamber 25b is arranged inside the entire circumference of the conveyor belt 21. The suction chamber 25b is configured to apply a suction force to each of the tablet suction ports 21a of the conveyor belt 21. The suction chamber 25b is connected to a suction source such as, for example, a suction pump (not illustrated) and generates the suction force by driving of the suction source. The suction source (suction device) is electrically connected to the control device 80, and is driven under the control of the control device 80.

As illustrated in FIG. 5, a plurality of through holes 25b1 and 25b2 are formed in the suction chamber 25b. The through holes 25b1 and 25b2 are formed vertically on the outer surface of the suction chamber 25b on the conveyor belt 21 side.

As illustrated in FIG. 4, a plurality of the through holes 25b1 are arranged at regular intervals in the conveying direction A1 between a pair of the guide portions 25a. As illustrated in FIG. 5, the through holes 25b1 connect the inside of the suction chamber 25b and a space between the pair of the guide portions 25a. In addition, the tablet suction ports 21a are located above a space between the pair of the guide portions 25a, and are connected to the space between the pair of the guide portions 25a via the through holes 21a1 of the conveyor belt 21. Thus, each of the through holes 25b1 of the suction chamber 25b, the pair of the guide portions 25a, and each of the through holes 21a1 of the conveyor belt 21 form a first suction path C1 extending from the inside of the suction chamber 25b to each of the tablet suction ports 21a. With this, the tablet T supplied onto each of the tablet suction ports 21a is sucked by the tablet suction port 21a and held on the conveyor belt 21. At this time, the suction force of the first suction path C1 acts on the conveyor belt 21 as well as on the tablet T, and therefore the conveyor belt 21 is also sucked. The suction force of the first suction path C1 applied to the conveyor belt 21 and the tablets T on the conveyor belt 21 is hereinafter referred to as "first suction force".

As illustrated in FIG. 5, the through holes 25b2 are each connected to one of the through holes 25a2 of the guide portions 25a, and are arranged at regular intervals in the conveying direction A1. Thus, each of the through holes 25b2 and each of the through holes 25a2 of the guide portions 25a form a second suction path C2 extending from the inside of the suction chamber 25b to each of the belt suction ports 25a1. Thereby, the conveyor belt 21 is sucked by the belt suction ports 25a1 and is maintained on the suction part 25, i.e., each of the guide portions 25a. Note that the second suction path C2 is a different path (another path) from the first suction path C1 and is not connected to the first suction path C1. The second suction path C2 applies a suction force only to the conveyor belt 21. The suction force of the second suction path C2 applied to the conveyor belt 21 is hereinafter referred to as "second suction force".

As illustrated in FIG. 4, in the conveyor belt 21, in a region (B2 to B3) from an upstream side end portion B2 of the imaging part 41 to a downstream side end portion B3 of the print head 51, a suction force lowering member 25c is provided for each conveying path of the tablets T. The suction force lowering member 25c is formed in, for example, a triangular shape such that the opening area of each of the through holes 25b1 aligned in the conveying direction A1 is gradually reduced along the conveying direction A1. The suction force lowering member 25c is located between each pair of the guide portions 25a. As a result, the suction force with respect to the tablets T in the region (B2 to B3) is gradually reduced along the conveying direction A1. Further, as illustrated in FIG. 5, the suction force lowering member 25c is removably provided on the outer surface of the suction chamber 25b. This allows the user to reduce the suction force with a desired pattern in a desired region by replacing or shifting the suction force lowering member 25c in the conveying direction A1 as necessary. The suction force lowering member 25c functions as a suction force adjuster.

In the conveyor belt 21, as indicated by solid line graph C1a in FIG. 4, the suction force of the first suction path C1 (suction force of C1) acts on the tablets T from the suction chamber 25b at least over a region (B1 to B4) from a tablet supply position B1 to a tablet drop position B4. There is no particular need to reduce the suction force on the tablets T in other regions (B1 to B2, B3 to B4) than the region (B2 to B3). Besides, as indicated by solid line graph C2a in FIG. 4, the suction force of the second suction path C2 (suction force of C2) is set constant to a desired value over the region (B1 to B4). With this, even if the suction force of the first suction path C1 gradually decreases in the region (B2 to B3), the conveyor belt 21 is sucked by at least the suction force of the second suction path C2.

In the region (B1 to B2), immediately after the tablet T is supplied onto the conveyor belt 21 at the tablet supply position B1, it is required to increase the suction force to quickly stabilize the posture of the tablet T and hold it on the conveyor belt 21. In the region (B3 to B4), the tablet T requires a suction force larger than its own weight and the centrifugal force generated during the conveyance from when it passes through the downstream side end portion B3 of the print head 51 until it reaches the tablet drop position B4, i.e., a suction force for preventing the tablet T from being separated from the conveyor belt 21. This suction force is very strong as compared to the suction force for preventing only the deviation of the tablet T.

For the sake of convenience, in the region of the conveyor belt 21 where the tablet T is conveyed, a region in which the tablet T is held on the conveyor belt 21 by a reduced suction force is referred to as "first region", and regions other than the first region are referred to as "second region". In the above example, the region (B2 to B3) from the upstream side end portion B2 of the imaging part 41 to the downstream side end portion B3 of the print head 51 corresponds to the first region, and the regions (B1 to B2, B3 to B4) other than the region (B2 to B3) correspond to the second region. These regions are arranged in the conveying direction A1. Incidentally, the suction force reduced in the first region includes zero suction force, i.e., no suction force applied. The suction force may be zero as long as the tablet T on the conveyor belt 21 does not shift due to the frictional force or the like during the conveyance, or the shift amount is within an allowable range even if the tablet T shifts.

As described above, by providing the suction force lowering member 25c in the region (B2 to B3) from the upstream side end portion B2 of the imaging part 41 to the downstream side end portion B3 of the print head 51, the suction force of the tablet suction ports 21a is reduced in the region (B2 to B3), and the amount of air sucked from the tablet suction ports 21a and the flow rate are also reduced. Thus, it is possible to suppress the occurrence of printing failure due to airflow and mist. In other words, at least the suction force for sucking the tablet T passing right under the print head 51 (the region from the upstream side end portion to the downstream side end portion B3 of the print head 51) can be made lower than a suction force for sucking the tablets T in other positions on the conveyor belt 21.

Further, by gradually reducing the suction force in the region (B2 to B3) from the upstream side end portion B2 of the imaging part 41 to the downstream side end portion B3 of the print head 51, it is possible to suppress the positional deviation of the tablet T and the like due to a sudden decrease in the suction force. For example, if the suction force suddenly changes, the tablet T may shift or shake, or it may drop off from the conveyor belt 21. However, such troubles can be reduced by gradually changing the suction force.

Further, as described above, information on the positional deviation of the tablet T is generated based on an image captured by the imaging part 41, and printing is performed by the print head 51 based on the information. Accordingly, on the conveyor belt 21, if the holding state of the tablet T when the image of the tablet T is captured by the imaging part 41 and the holding state of the tablet T when printing is performed by the print head 51 has changed, printing deviation occurs. Therefore, it is most preferable that the suction force in the first region B2 to B3 is constant. Even in the case of changing the suction force, preferably, it is gradually changed as described above.

In the region (B2 to B3), the suction force of the tablet suction ports 21a for sucking the tablets T is reduced by the suction force lowering member 25c as compared to the other regions (B1 to B2, B3 to B4). Along with this, the suction force acting on the conveyor belt 21 by the suction of the first suction path C1 also decreases. However, apart from the first suction path C1, the suction force of the second suction path C2 acts on the conveyor belt 21. That is, the conveyor belt 21 is sucked by the belt suction ports 25a1. Thus, the belt suction force for sucking the conveyor belt 21 is maintained at a desired value even if the tablet suction force for sucking the tablets T is reduced. This makes it possible to suppress the conveyor belt 21 from lifting off the guide portions 25a and moving up and down due to a reduction in the suction force applied to the conveyor belt 21. The suction force for sucking the conveyor belt 21 is set to such a value that the conveyor belt 21 can move with the rotation of the drive pulley 22 and does not lift or move up and down.

Printing Step

Next, a printing step (printing process) performed by the tablet printing apparatus 1 will be described.

First, various information such as print data required for printing is stored in the storage of the control device 80. In addition, a large number of tablets T to be printed are stored in the hopper 11 of the supply device 10. When the tablet printing apparatus 1 is driven, the conveyor belt 21 of the conveying device 20 rotates in the conveying direction A1 along with the rotation of the drive pulley 22 and the driven pulley 23 by the drive part 24. While the conveyor belt 21 is rotating, the tablets T are sequentially supplied from the supply device 10 onto the conveyor belt 21 not regularly but randomly. The tablets T are conveyed at a predetermined moving speed in two rows on the conveyor belt 21.

Each of the detection parts 31 detects each tablet T on the conveyor belt 21 in each conveying path of the tablets T, and outputs a detection signal to be input to the control device 80 as a trigger signal. Thereafter, each of the imaging parts 41 captures an image of each tablet T on the conveyor belt 21 in each conveying path of the tablets T. The imaging parts 41 each capture an image of the upper surface of the tablet T at the timing based on the trigger signal, i.e., at the timing when the tablet T reaches below the imaging parts 41, and send the image to the image processing device 70. The image processing device 70 generates information on the positional deviation of the tablet T (for example, the positional deviation of the tablet T in the X direction, Y direction, and θ direction) based on the image received from each of the imaging parts 41, and sends it to the control device 80. The control device sets printing conditions (ink ejection position, ink ejection speed, etc.) for the tablet T based on the positional deviation information of the tablet T.

Thereafter, the printing device 50 performs printing on each of the tablets T on the conveyor belt 21 at the timing based on the trigger signal, i.e., at the timing when the tablet T reaches below the print head 51, based on the printing conditions. In each of the print heads 51 of the printing device 50, ink is appropriately ejected from each of the nozzles 51a to print identification information such as a letter, a character or a mark on the upper surface of the tablet T. The ink applied to the tablet T is dried before the tablet T is collected by the collecting device 60. After the ink is dried, the tablet T comes to the downstream end of the conveyor belt 21, and is released from holding by the conveyor belt 21. Thereby, the tablet T falls from the conveyor belt 21, and is collected by the collecting device 60. If necessary, a drying device may be provided above the conveyor belt 21 to dry the ink applied to the tablet T.

In the printing step, the tablets T on the conveyor belt 21 are sucked and held by the suction force given by the first suction path C1, and the conveyor belt 21 is sucked by the suction force given by the second suction path C2 different from the first suction path C1. In this manner, the conveyor belt 21 is sucked by a path different from the path for sucking the tablets T. Accordingly, even if the tablet suction force for sucking the tablets T is reduced, the belt suction force for sucking the conveyor belt can be maintained at a desired value. As a result, it is possible to suppress the conveyor belt 21 from lifting off the guide portions 25a and moving up and down. Thus, the positional deviation of the tablets T can be suppressed, and the degradation of print quality can be prevented. Note that it is necessary to suppress the vertical movement of the conveyor belt 21 at least in a region immediately below the print head 51.

Further, in the conveyor belt 21, the suction force of the tablet suction ports 21a is gradually reduced along the conveying direction A1 in a predetermined region (for example, the first region) including a region immediately below the print head 51. With this, the amount of air sucked from the tablet suction ports 21a and the flow rate gradually decrease in the predetermined region, which suppresses the generation of airflow in a space between the tablets T on the conveyor belt 21 and the print head 51. As a result, it is possible to prevent the degradation of print quality due to airflow and mist as well as to suppress the conveyor belt 21 from lifting off the guide portions 25a and moving up and down due to a sudden change of the suction force. In other words, as well as suppressing the generation of airflow that lowers the print quality in a space between the tablets T on the conveyor belt 21 and the print head 51, it is also possible to suppress the tablets T from shifting or swinging when the suction force is reduced for that. Thus, by appropriately controlling the suction force for holding the tablets T, stable ink ejection from the print head 51 can be achieved, and the print quality can be maintained.

Incidentally, when the belt suction force is increased, the rotational resistance (frictional force) of the conveyor belt 21 increases, and a motor having a stronger rotational force is required as the drive part 24. Therefore, in order to minimize the belt suction force for sucking the conveyor belt 21, it is preferable to provide the belt suction ports 25a1 only in the portion where it is desired to lower the tablet suction force for sucking the tablet T. In this case, for example, when the tablet suction force of the first suction path C1 is lowered in the region (B2 to B3) as illustrated in FIG. 4, the suction force given by the second suction path C2 to the conveyor belt 21 is prevented from occurring except in the region (B2 to B3). In other words, the belt suction ports 25a1 are provided only in the region (B2 to B3). That is, it is preferable that the range in which the belt suction ports 25a1 are provided be narrower than the range in which the suction force lowering member 25c is provided. This is because if the belt suction ports 25a1 are provided in a range wider than the range in which the suction force applied to the conveyor belt 21 is lowered by the suction force lowering member 25c, the frictional force applied to the conveyor belt 21 increases. In order to suppress the increase of the frictional force, it is desirable that the opening area of the belt suction port 25a1 be smaller than the opening area of the tablet suction port 21a.

As the frictional force of the conveyor belt 21 increases, the load on the drive part 24 that rotates the conveyor belt 21 also increases, which may change the speed at which the conveyor belt 21 rotates. As a result, the conveyor belt 21 vibrates, and the tablets T on the conveyor belt 21 also vibrates. That is, the position and number of the belt suction ports 25a1 (i.e., the second suction path C2) are determined within a range in which the conveyor belt 21 does not lift off the guide portions 25a and the conveying speed of the conveyor belt 21 does not change due to an increase in the load on the drive part 24.

In addition, in the adjustment of the suction force of the first suction path C1, the suction force of the first suction path C1 need not always be linearly changed as indicated by solid line graph C1a in FIG. 4. The change rate of the suction force of the first suction path C1 may be changed as indicated by dotted line graphs C1b and C1c in FIG. 4.

It is also possible to gradually change the suction force of the second suction path C2 as indicated by dotted line graph C2b in FIG. 4 according to the change of the suction force of the first suction path C1. In this case, the opening area of each of the belt suction ports 25a1 arranged in the conveying direction A1 is gradually increased along the conveying direction A1. With this, in the region (B2 to B3), although the suction force of the first suction path C1 acting on the conveyor belt 21 decreases, the suction force of the second suction path C2 acting on the conveyor belt 21 increases. Accordingly, the total belt suction force can be kept constant. That is, when the tablet suction force is changed, the belt suction force at that portion also changes. Therefore, in order to make the belt suction force constant, the suction force of the second suction path C2 has to be changed as described above. In the case of gradually changing the tablet suction force, it is necessary to gradually change the suction force of the second suction path C2. Incidentally, the suction force lowering member 25c which reduces the suction force along the conveying direction A1 functions as a first suction force adjuster, and each of the belt suction ports 25a1, whose opening area gradually increases along the conveying direction A1, functions as a second suction force adjuster.

Further, as to the belt suction force, it is sufficient to maintain a minimum suction force with which the conveyor belt 21 does not lift off. As indicated by solid line graph C2a in FIG. 4, the second suction path C2 may constantly apply a predetermined suction force to the conveyor belt 21. Alternatively, as indicated by dashed-dotted line graph C2c in FIG. 4, by adjusting the opening area of each of the belt suction ports 25a1 in the region (B2 to B3), the suction force of the second suction path C2 can be made strong and constant as compared to other regions (B1 to B2, B3 to B4). In this case, because of the change of the tablet suction force, the belt suction force also changes at that portion. Even if the tablet suction force becomes zero, the minimum necessary belt suction force is maintained by the suction of the second suction path C2. At this time, the total belt suction force is not constant.

As described above, according to the first embodiment, the suction part 25 includes the first suction path C1 for sucking the tablets T on the conveyor belt 21 and the second suction path C2 for sucking the conveyor belt 21. In this manner, the path for sucking the tablets T is different from the path for sucking the conveyor belt 21. Therefore, even if the tablet suction force for sucking the tablets T is reduced, the belt suction force for sucking the conveyor belt 21 can be maintained at a desired value. Thereby, it is possible to suppress the conveyor belt from lifting off the guide portions 25a and moving up and down. As a result, the positional deviation of the tablets T can be suppressed, and degradation in print quality can be suppressed.

Actually, by providing the belt suction ports 25a1, the likelihood that the tablet T was determined to be non-defective was increased in the inspection after printing. When there was no belt suction port 25a1, the non-defective product rate was 97.8%. On the other hand, with the belt suction ports 25a1, the non-defective product rate was improved to 99.7%.

In the first embodiment, the tablets T are conveyed as being sucked and held on the conveyor belt 21, and printing is performed by the inkjet print head 51. Particularly, centrifugal force acts on the portion of the drive pulley 22 heading toward the collecting device 60, and therefore, the suction force is set to prevent the tablets T on the conveyor belt from flying away. In this case, a print error occurs in the printing portion due to an airflow accompanying the suction by the same suction force as in the portion of the drive pulley 22. For this reason, the suction force in the printing portion, i.e., the suction force of the first suction path C1 is reduced. Since this suction force acts not only on the tablets T but also on the conveyor belt 21, when the suction force is reduced, the conveyor belt 21 may be lifted off the guide portions 25a, or the conveyor belt 21 may move up and down.

Therefore, apart from sucking the tablets T, the conveyor belt 21 is sucked by the suction force of the second suction path C2. With this, even if the suction force to the tablets T is reduced to suppress the occurrence of airflow in the printing portion so as to suppress print errors, the conveyor belt 21 is suppressed from lifting off the guide portions 25a or moving up and down due to a decrease in the belt suction force. Thus, it is possible to suppress the occurrence of print errors due to the positional deviation of the tablets T. Incidentally, if the suction force is suddenly reduced, the conveyor belt lifts off the guide portions 25a and moves up and down strongly at that portion. Therefore, it is preferable to gradually change the suction force.

Second Embodiment

The second embodiment will be described with reference to FIG. 6. In the second embodiment, differences from the first embodiment (the structure of the suction part) will be described, and other explanation will be omitted.

Figure 6:
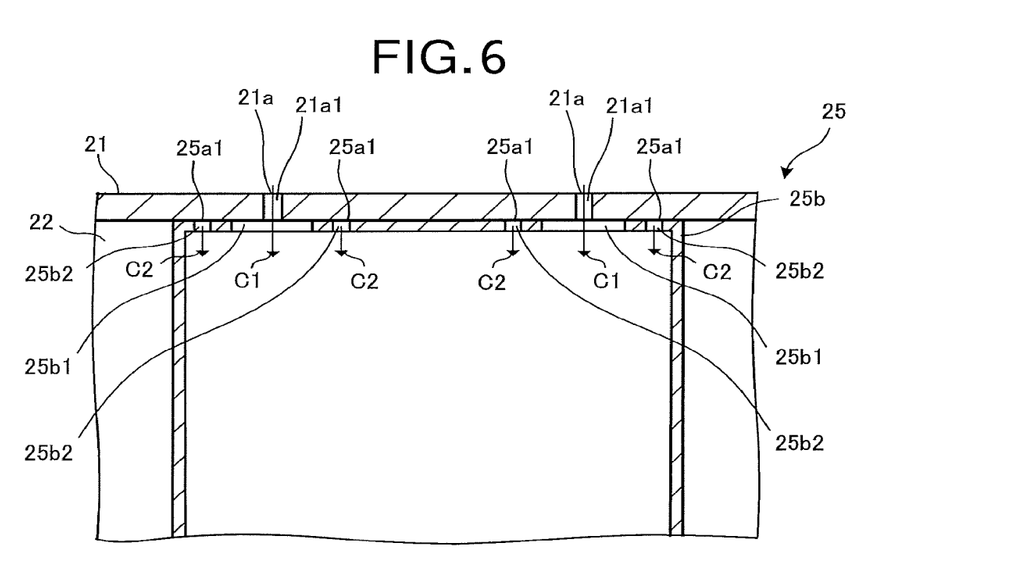
FIG. 6 is a cross-sectional view illustrating an enlarged view of a part of a tablet conveying device according to a second embodiment.

As illustrated in FIG. 6, the suction part 25 of the second embodiment is not provided with the guide portions 25a, and directly supports the conveyor belt 21 by the outer surface of the suction chamber 25b. The through hole 25b1 of the suction chamber 25b is formed as a slit-shaped through hole extending in the longitudinal direction over the longitudinal region of the conveyor belt 21. The through hole 25b1 and each of the through holes 21a1 of the conveyor belt 21 form a first suction path C1. Besides, the openings on the upper end side of the through holes 25b2 of the suction chamber 25b correspond to the belt suction ports 25a1. Thus, each of the through holes 25b2 corresponds to the second suction path C2.

The conveyor belt 21 is directly attracted to the outer surface of the suction chamber 25b by the suction force of each of the belt suction ports 25a1. The suction force for sucking the conveyor belt 21 is set such that the conveyor belt 21 can move by the rotation of the drive pulley 22 while being prevented from lifting off the guide portions 25a and moving up and down. Since the conveyor belt 21 and the suction chamber 25b are in direct contact with each other, in order to reduce the frictional resistance thereof, it is desirable that the contact surfaces between the conveyor belt 21 and the suction chamber 25b is processed to improve the sliding property.

As described above, according to the second embodiment, it is possible to achieve the same effect as that of the first embodiment. Since the path for sucking the tablets T is different from the path for sucking the conveyor belt 21, for example, even when the guide portions 25a are eliminated, and even if the tablet suction force for sucking the tablets T is reduced, the belt suction force for sucking the conveyor belt 21 can be maintained at a desired suction force. Thereby, it is possible to suppress the conveyor belt 21 from lifting off the outer surface of the suction chamber 25b and moving up and down. As a result, the positional deviation of the tablets T can be suppressed, and degradation in print quality can be suppressed.

Other Embodiments

In the above embodiments, the tablets T are conveyed in two rows; however, it is not so limited. There may be one row, three rows, or four or more rows. The number of rows is not particularly limited.

In the above embodiments, there is provided only one conveyor belt 21; however, it is not so limited. The number of conveyor belt is not particularly limited, and there may be two or more conveyor belts.

In the above embodiments, the print head 51 is described as being provided for each conveying path of the tablets T; however, it is not so limited. For example, printing on two or more rows of tablets T may be performed by one print head 51.

In the above embodiments, an example is described in which the timing of printing is determined based on the detecting device 30; however, it is not so limited. For example, the timing of printing may be determined based on the imaging device 40.

In the above embodiments, a print head in which the nozzles 51a are arranged in a row is described as an example of the inkjet print head 51; however, it is not so limited. For example, a print head in which the nozzles 51a are arranged in a plurality of rows may be used. Further, a plurality of print heads 51 may be arranged along the conveying direction A1 of the tablets T.

In the above embodiments, the suction part 25 is formed over the entire circumference of the conveyor belt 21; however, it is not so limited. The suction part 25 need not necessarily extend over the entire circumference of the conveyor belt 21. The suction part 25 may be formed only in a portion from where the tablet T is supplied to where it is collected as described above.

In the above embodiments, an example is described in which printing is performed on one side of the tablet T; however, it is not so limited. For example, the conveying devices 20 may be arranged one above the other. In this case, after one side of the tablet T is printed by the upper conveying device 20, the tablet T is inverted and delivered to the lower conveying device 20 to print the other side of the tablet T.

In the above embodiments, as an example of the suction mechanism for sucking the tablets T, the tablets T are described as being held by a plurality of circular tablet suction ports 21a aligned in the conveying direction A1; however, it is not so limited. For example, the tablet suction ports 21a may have such a shape as rectangle, ellipse, slit, and the like, and is not particularly limited.

In the above embodiments, a plurality of the belt suction ports 25a1 are formed over the entire circumference of the conveyor belt 21 along the conveying direction A1; however, it is not so limited. For example, it is sufficient that one belt suction port 25a1 or two or more belt suction ports 25a1 are formed in a position or a region where the vertical movement of the conveyor belt 21 can be suppressed at least in a region immediately below the print head 51. That is, the belt suction ports 25a1 may be formed in a position or a region where the conveyor belt 21 lifts off the guide portions 25a or the outer surface of the suction chamber 25b, or moves up and down due to a decrease in the suction force to the conveyor belt 21 caused by a decrease in the suction force to the tablet T. Further, the belt suction ports 25a1 need not necessarily be located around the tablet suction ports 21a or on both sides thereof, and may be anywhere as long as the conveyor belt 21 can be sucked.

In the above embodiments, a triangular plate member is described as an example of the suction force lowering member 25c; however, it is not so limited. For example, the suction force lowering member 25c may be an elliptical plate member, and may have any shape as long as it can gradually change the opening area of the through hole 25b1. Further, it is also possible to use a punching board, a porous member, a net member or the like. In this case, the density of the pores is reduced such that the opening area of the through hole 25b1 gradually decreases along the conveying direction A1.

In the above embodiments, an example is described in which the suction force is reduced by the suction force lowering member 25c; however, it is not so limited. For example, the size of the through hole 25b1 is decreased to reduce the suction force. Alternatively, the inside of the suction chamber 25b may be divided into a plurality of sections (two or more sections), and a different suction force may be assigned to each section so as to reduce the suction force of a predetermined section. Various types of suction force adjusting means (suction force adjusters) can be used. As an example, the inside of the suction chamber 25b may be divided into three sections. In this case, the suction force of the first section is set to be middle, the suction force of the second section is set to be weak, and the suction force of the third section is set to be strong.

For example, the inside of the suction chamber 25b can be divided into a section corresponding to a predetermined region (B2 to B3) and other sections, and there may be provided suction sources for each section and a controller that controls the suction sources. In this case, as an example, the first suction force is reduced by the suction force lowering member 25c in the predetermined region (B2 to B3) on the conveyor belt 21, and according to the reduction of the first suction force, the controller controls the suction source and increases the second suction force of the section corresponding to the predetermined region (B2 to B3). At this time, the suction force lowering member 25c functions as a first suction force adjuster and the controller functions as a second suction force adjuster.

In the above embodiments, an example is described in which the suction force is reduced in the region (B2 to B3) from the upstream side end portion B2 of the imaging part 41 to the downstream side end portion B3 of the print head 51; however, it is not so limited. For example, the suction force may be reduced only when the tablet T passes directly below the print head 51. In this case, the region from the upstream side end portion of the print head 51 to the downstream side end portion B3 is the first region. In addition, for example, the suction force may be reduced from when the tablet T is supplied to the conveyor belt 21 until it passes immediately below the print head 51. In this case, the region from the tablet supply position B1 to the downstream side end portion B3 of the print head 51 is the first region.

In the above embodiments, an example is described in which the suction force is gradually reduced in the region (B2 to B3) from the upstream side end portion B2 of the imaging part 41 to the downstream side end portion B3 of the print head 51; however, it is not so limited. For example, the suction force may be reduced to a predetermined value in a region before the upstream side end portion B2 of the imaging part 41 or the detection part 31, and may be kept constant at the predetermined value. In this case, since the tablets T are sucked by the constant suction force in the region (B2 to B3), the position, posture, and the like of the tablets T are suppressed to change depending on the difference in the suction force between the detection time and the printing time. Therefore, it is possible to suppress the degradation of print quality due to the difference in the position, posture, and the like of the tablets T caused by the difference in the suction force.

Figure 7:
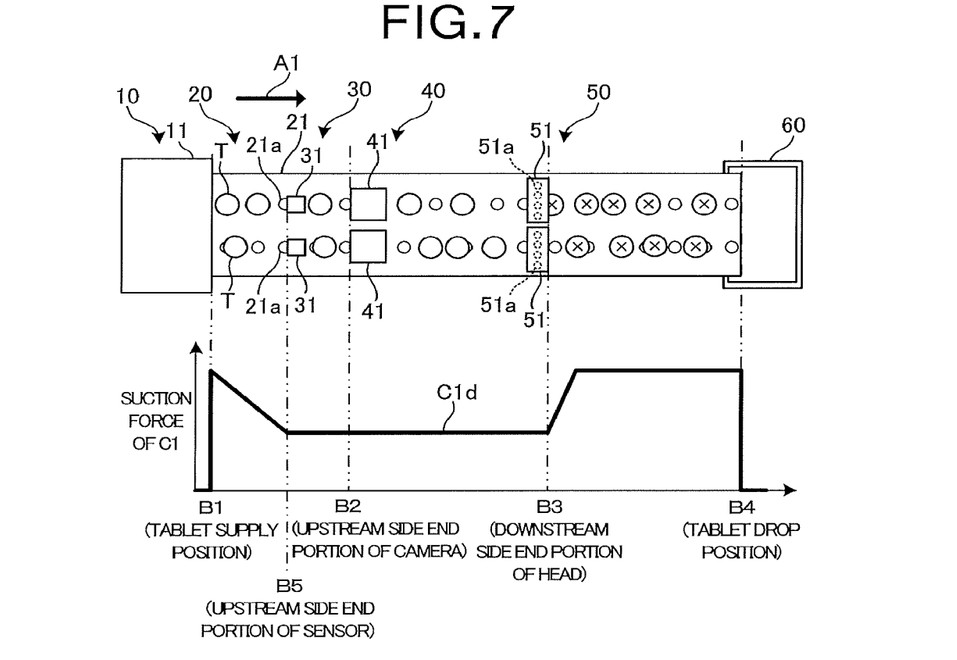
FIG. 7 is a diagram for explaining changes in the suction force different from the changes of the suction force in the first embodiment.

If the tablet T deviates from the position where the tablet T is detected by the detecting device 30, the print quality is degraded. Therefore, the suction force may be unchanged from the position where the tablet T is detected. In this case, as indicated by solid line graph C1d in FIG. 7, after the suction force is gradually reduced in a region from the tablet supply position B1 to a sensor upstream side end portion B5, the suction force is maintained until the downstream side end portion B3 of the print head 51. Then, the suction force is restored after printing is performed by the print head 51.

When an inspection device is provided above the conveyor belt 21 on the downstream side of the print head 51 in the conveying direction A1, the above-described reduced suction force is restored after the inspection of the inspection device. In the case where the inspection device is arranged on the downstream side of the print head 51 in the conveying direction A1, printing is performed by the print head 51 based on the state of the tablet T imaged by the imaging part 41 as described above, and the inspection device determines whether the printing is successful. That is, if the state of the tablet T changes during a period from the imaging of the imaging part 41 to the inspection of the inspection device, the inspection device determines that the printing is defective. Therefore, it is most preferable that the range in which the suction force is changed include a region from the position where the tablet T is imaged by the imaging part 41 to the position where the printing state is inspected by the inspection device on the downstream side of the print head 51, and the suction force be constant in the region.

Besides, preferably, the belt suction port 25a1 is provided in a position close to the through hole 25b1. By sucking the conveyor belt 21 at a position close to the through hole 25b1 where the tablet T is sucked, the conveyor belt 21 is suppressed from lifting off the guide portions 25a or the outer surface of the suction chamber 25b, or moving up and down around the tablet T. Thus, it is possible to suppress the degradation of print quality of the tablets T.

In the above first embodiment, the belt suction ports 25a1 are provided in the pair of guide portions 25a, i.e., so as to sandwich each of the tablet suction ports 21a. However, it is not so limited. The belt suction ports 25a1 may be provided only in one of the guide portions 25a. Alternatively, a row of the belt suction ports 25a1 may be arranged between two rows of the tablet suction ports 21a.

In the above embodiments, the guide portions 25a and the suction chamber 25b are described as being separate from each other; however, it is not so limited. For example, the suction chamber 25b may have an opening in the ceiling thereof, and the ceiling of the suction chamber 25b may be closed with a plate-like lid having the guide portions 25a. In this case, the through holes 25a2 of the guide portions 25a are directly connected to the inside of the suction chamber 25b.

In the above embodiments, an example is described in which the common suction chamber 25b is used; however, it is not so limited. For example, the chamber may be provided separately for each of the first suction path C1 and the second suction path C2. Further, a suction source (for example, a suction pump) may also be provided separately. In this case, the suction part 25 includes a plurality of suction chambers and a plurality of suction sources, and may be provided with a controller for controlling the suction sources individually.

In the above embodiments, the conveyor belt 21 is sucked so as to be prevented from lifting off the guide portions 25a and moving up and down. However, it is not so limited. For example, the conveyor belt 21 may be pressed by a roller from the tablet conveying side (upper side) of the conveyor belt 21, or air or the like may be blown onto the conveyor belt 21 within a range that does not affect the inkjet ejection. Alternatively, a belt containing a magnetic material may be used as the conveyor belt 21 so as to be attracted by a magnetic force.

In the above embodiments, the tablets T are collected by the collecting device 60 after printing; however, it is not so limited. For example, after printing, the tablets T may be transferred to the conveyor for the next process.

The above-described tablets may include tablets for pharmaceutical use, edible use, cleaning, industrial use, and aromatic use. Examples of the tablets include plain tablets (uncoated tablets), sugar-coated tablets, film-coated tablets, enteric coated tablets, gelatin coated tablets, multilayered tablets, dry-coated tablets, and the like. Examples of the tablet further include various capsule tablets such as hard capsules and soft capsules. The tablets may be in a variety of shapes such as, for example, a disk shape, a lens shape, a triangle shape, an oval shape, and the like.

In the case where tablets to be printed are for pharmaceutical use or edible use, edible ink is suitably used. As the edible ink, any of synthetic dye ink, natural color ink, dye ink, and pigment ink may be used.

While certain embodiments have been described, these embodiments have been presented by way of example only, and are not intended to limit the scope of the inventions. Indeed, the novel embodiments described herein may be embodied in a variety of other forms; further, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A tablet printing apparatus, comprising:
    a conveyor belt configured to convey a tablet;
    a supplier configured to supply the tablet onto the conveyor belt;
    a first suction path configured to suck the tablet on the conveyor belt to hold the tablet on the conveyor belt and suck the conveyor belt while allowing the conveyor belt to convey the tablet;
    a second suction path configured as a different path from the first suction path to suck only the conveyor belt while allowing the conveyor belt to convey the tablet;
    a suction force adjuster configured to reduce a first suction force provided by the first suction path in a predetermined region of a plurality of regions located in a conveying direction of the tablet as compared to that in other regions;
    a position detector configured to detect a position of the tablet conveyed by the conveyor belt; and
    a printer configured to perform printing on the tablet conveyed by the conveyor belt.

2. The tablet printing apparatus according to claim 1, wherein the predetermined region is a region from a position on an upstream side of the position of the tablet on the conveyor belt detected by the position detector to a position where the printer performs printing on the tablet on the conveyor belt.

3. The tablet printing apparatus according to claim 1, wherein the second suction path is provided only in the predetermined region.

4. The tablet printing apparatus according to claim 1, wherein a second suction force provided by the second suction path is constant.

5. The tablet printing apparatus according to claim 1, wherein the first suction path and the second suction path are connected to a common suction source.

6. The tablet printing apparatus according to claim 1, wherein
    the second suction path includes a plurality of suction ports, and
    a number of the suction ports and their respective positions are determined within a range in which the conveyor belt does not lift off and a conveying speed of the conveyor belt does not change due to an increase in load on a drive part that drives the conveyor belt.

7. The tablet printing apparatus according to claim 1, further comprising a suction part configured to support the conveyor belt and including the first suction path and the second suction path, wherein the conveyor belt includes a tablet suction port corresponding to an opening of the first suction path and configured to suck the tablet on the conveyor belt, and the suction part includes a plurality of belt suction ports corresponding to an opening of the second suction path and configured to suck only the conveyor belt, the belt suction ports being formed so as to sandwich the tablet suction port from directions crossing a conveying direction of the tablet.

8. The tablet printing apparatus according to claim 1, further comprising a suction part configured to support the conveyor belt and including the first suction path and the second suction path, wherein the conveyor belt includes a tablet suction port corresponding to an opening of the first suction path and configured to suck the tablet on the conveyor belt, and the suction part includes a belt suction port corresponding to an opening of the second suction path and configured to suck only the conveyor belt, an opening area of the belt suction port being smaller than an opening area of the tablet suction port.

9. A tablet printing apparatus comprising:
a conveyor belt configured to convey a tablet;
a supplier configured to supply the tablet onto the conveyor belt;
a first suction path configured to suck the tablet on the conveyor belt to hold the tablet on the conveyor belt and suck the conveyor belt while allowing the conveyor belt to convey the tablet;
a second suction path configured as a different path from the first suction path to suck only the conveyor belt while allowing the conveyor belt to convey the tablet;
a first suction force adjuster configured to reduce a first suction force provided by the first suction path;
a second suction force adjuster configured to increase a second suction force provided by the second suction path according to a reduction in the first suction force;
a position detector configured to detect a position of the tablet conveyed by the conveyor belt; and
a printer configured to perform printing on the tablet conveyed by the conveyor belt.

10. A tablet printing method for printing on a tablet conveyed by a conveyor belt, the method comprising:
sucking the tablet on the conveyor belt by a first suction force provided by a first suction path to hold the tablet on the conveyor belt;
sucking only the conveyor belt by a second suction force provided by a second suction path configured as a different path from the first suction path,
reducing the first suction force; and
increasing the second suction force according to a reduction in the first suction force.

11. The tablet printing method according to claim 10, further comprising reducing the first suction force provided by the first suction path in a region from a position on an upstream side of a position where the tablet on the conveyor belt is detected to a position where printing is performed on the tablet on the conveyor belt.

* * * * *